United States Patent [19]

Doust

[11] Patent Number: 5,984,268

[45] Date of Patent: Nov. 16, 1999

[54] SEALING MEMBER AND A VALVE CLOSURE MEMBER INCORPORATING SAME

[76] Inventor: Philip George Doust, P.O. Box 19, North Beach, Western Australia, Australia, 6020

[21] Appl. No.: 09/017,729

[22] Filed: Feb. 3, 1998

[30] Foreign Application Priority Data

Feb. 4, 1997 [AU] Australia ................................. PO4949
Mar. 25, 1997 [AU] Australia ................................. PO5860

[51] Int. Cl.$^6$ .................................................. F16K 51/00
[52] U.S. Cl. .......................................... 251/175; 251/357
[58] Field of Search ..................................... 251/175, 357

[56] References Cited

U.S. PATENT DOCUMENTS

| | | | |
|---|---|---|---|
| 2,844,353 | 7/1958 | Gurries | 251/175 |
| 3,043,554 | 7/1962 | de La Garza | 251/175 |
| 3,103,948 | 9/1963 | Salmen | 251/175 X |
| 4,064,904 | 12/1977 | Tolnai . | |
| 4,889,162 | 12/1989 | Newcombe et al. | 251/175 X |

FOREIGN PATENT DOCUMENTS

| | | |
|---|---|---|
| 65723/65 | 4/1967 | Australia . |
| 30643/67 | 6/1970 | Australia . |
| 1164678 | 9/1969 | United Kingdom . |
| 1184658 | 3/1970 | United Kingdom . |

*Primary Examiner*—John Fox

[57] ABSTRACT

A sealing member 10 for a valve 12 includes a body 14 defining a cavity 16 and, a resiliently deformable membrane 18 extending across a lower end 20 of the body 14. The membrane 18 is provided with an aperture 22 through which fluid can flow to enter the cavity 16. The valve 12 typically has an inlet 24, an outlet 26, and a seat 28 through which fluid must flow in order to pass from the inlet 24 to the outlet 26. The sealing member 10 is configured to seal against the seat 28. When the sealing member 10 is seated on seat 28 to at least partially seal the valve 12, fluid enters the cavity 16 through aperture 22 and, by action of fluid pressure in the fluid, forces the resiliently deformable membrane 18 against the valve seat 28 to further seal the valve 12.

5 Claims, 2 Drawing Sheets

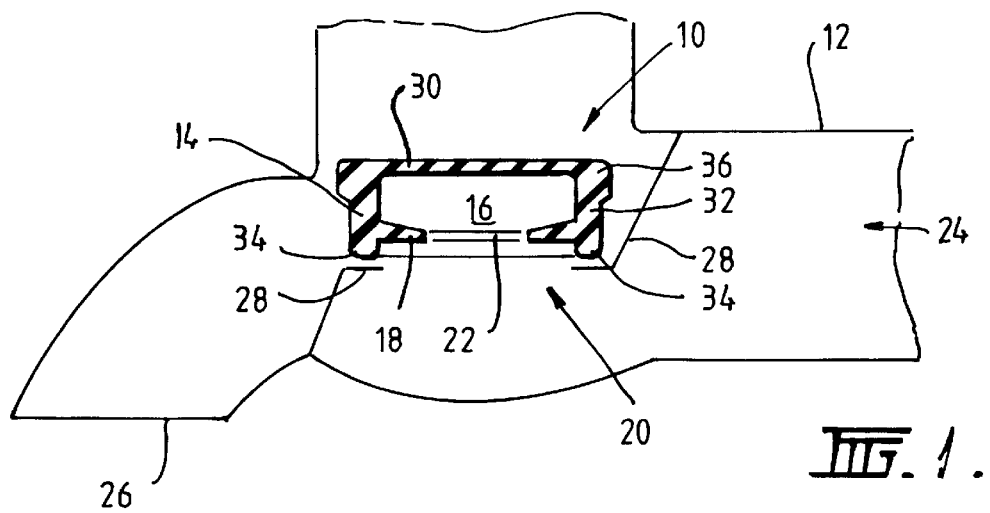
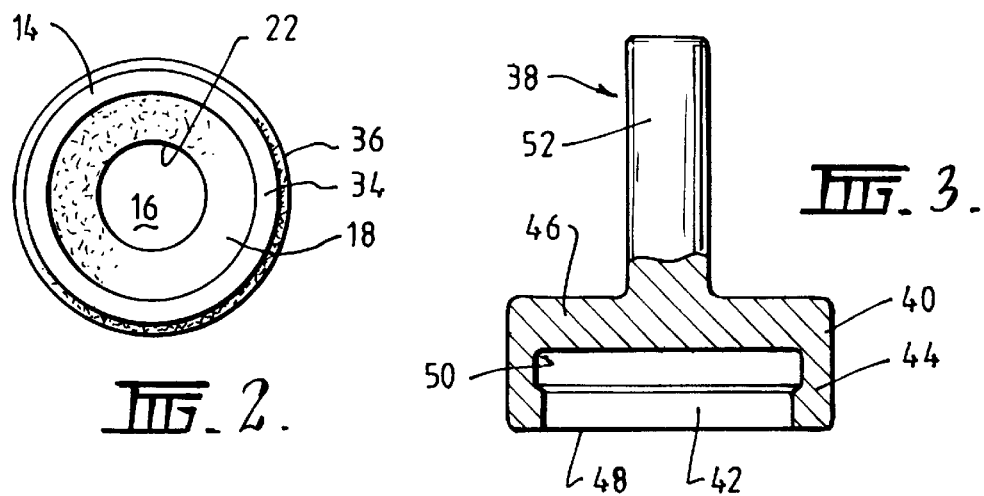
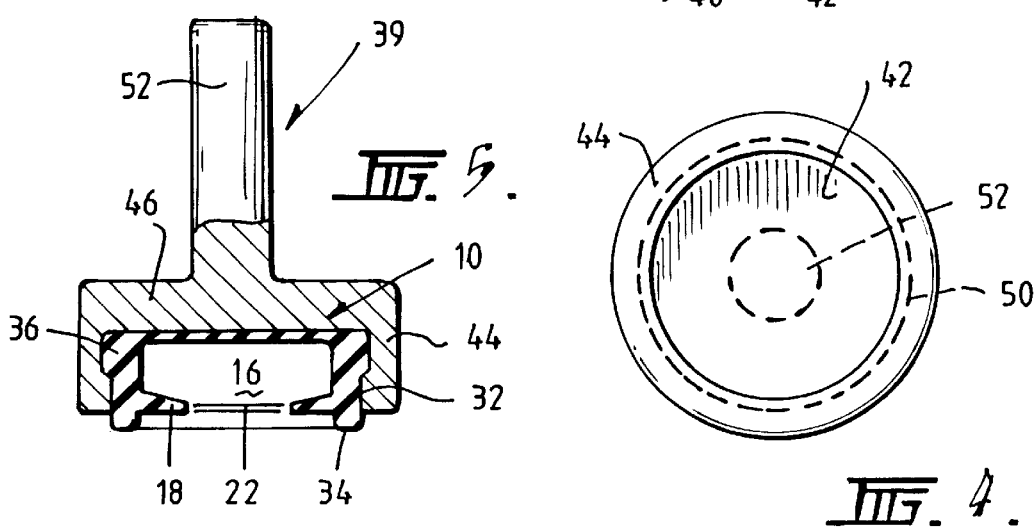

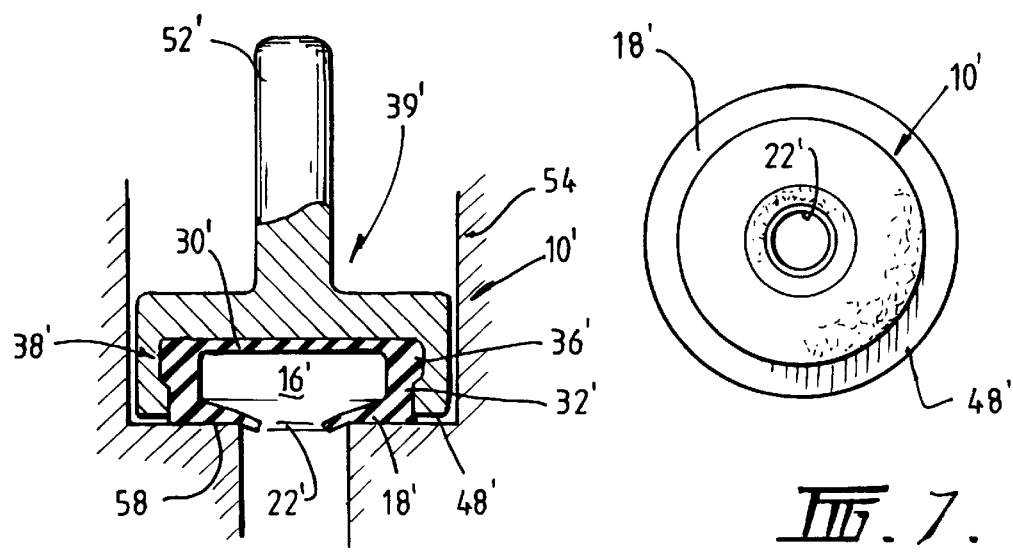
FIG. 6.
FIG. 7.
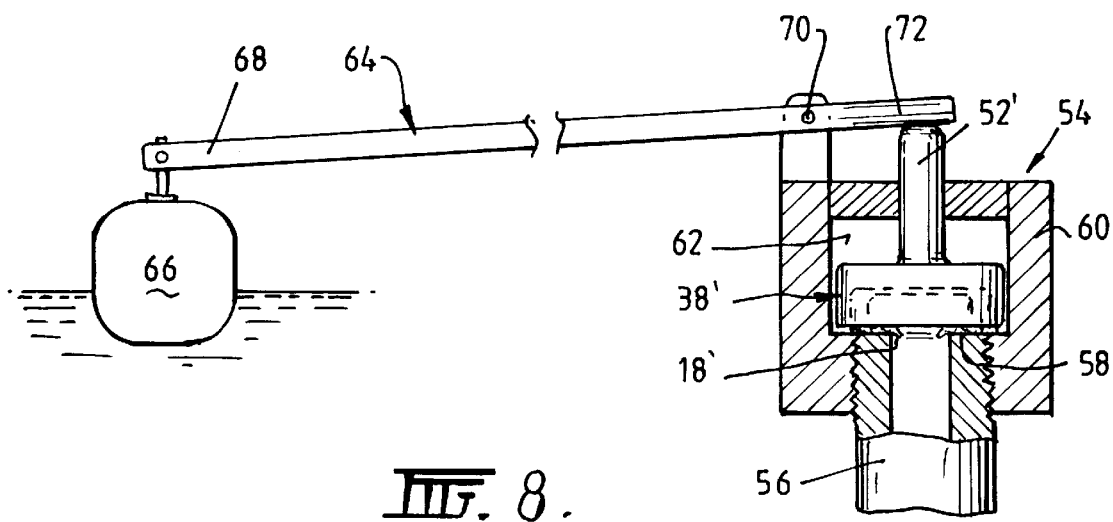
FIG. 8.

SEALING MEMBER AND A VALVE CLOSURE MEMBER INCORPORATING SAME

BACKGROUND OF THE INVENTION

1. Field of the Invention

The present invention relates to a sealing member for a fluid valve exemplified by, but not limited to, a water tap or a ballcock float valve, and to a valve closure member incorporating the sealing member for sealing a fluid valve.

2. Description of the Related Art

A conventional domestic water tap consists of a tap head threadingly connected to a tap body, the tap body including a water passageway having a fluid inlet, a fluid outlet, and a tap seat therebetween. A spindle provided with a handle at one end is threadingly retained within the head so that rotation of the spindle in opposite directions moves the spindle up and down (i.e., linearly) within the tap body. A washer assembly is typically received within a hole formed in an opposite end of the spindle and is arranged for seating on the tap seat. Thus, as the spindle is turned in opposite directions, the washer assembly can be moved up and down (i.e., linearly) into and out of contact with the tap seat to effect opening and closing of the tap. To this end, the washer assembly typically includes a resilient sealing member which is forced against the tap seat by the linear motion of the spindle to effect the closing of the tap.

This type of washer assembly and sealing member suffer from various problems. Because the sealing member is often pushed up hard against the seat it tears, splits or otherwise fractures and thus requires frequent replacement in order to prevent leakage from the tap. Further, the washer assembly provides a very rigid shut off of water flow and leads the production of water hammer.

The HYDROSEAL™ washer was invented with a view to overcoming the above problems. The HYDROSEAL washer is designed to retrofit to any conventional water tap in place of the normal washer assembly described above. The HYDROSEAL washer as described in Australian Patent Number 567174, consists of a stem formed together with a disc, the stem adapted to removably located within a bore of a conventional tap spindle. The disc has a circular-shaped recess in which a circular shaped plate is fixed. The circular plate is spaced from the walls of the recess so as to define an annular recess and circular channel in fluid communication with each other. The circular channel is trapezium shaped in cross section and configured to house an o-ring seal which protrudes from the disc and plate. The o-ring seal is designed to seat upon a tap seat on closure of the tap. The plate includes an aperture which allows water to flow into the annular recess and circular channel and thus force the a-ring seal against the tap seat. Thus, closure of the tap is assisted by water pressure.

While the HYDROSEAL washer functions adequately, it is reasonably complex in construction and therefore expensive. Further, the o-ring seal is relatively rigid and does not effectively seat upon uneven or rough tap seats.

Another type of valve, known as the ballcock float valve, is used to regulate the flow of mains water to a lavatory cistern. The ballcock valve includes a tube which is located within the cistern into which water entering the cistern flows. The tube at one end has a water outlet against which a plunger seats so as to open or close the flow of water to the cistern. The plunger includes a sealing washer which seats around a periphery of the water outlet. The ballcock float valve further includes a fulcrum member having a float connected at one end, the fulcrum member adapted at the other end to bear against the plunger so as to seat and unseat it from the water outlet. Frequent seating against the water outlet progressively wears and or deforms the sealing washer. When in this condition, the washer cannot completely seal against the water outlet and mains water slowly leaks into the cistern. This water then overflows into the toilet proper and is as wasted. Additionally, when the plunger is seated it compresses the washer which increases the volume of water held in the cistern for flushing, again leading to the wasting of water. To avoid this, the plunger or other components of the ballcock float valve require servicing or replacement.

SUMMARY OF THE INVENTION

It is an object of the present invention to provide a sealing member which can be used in a variety of fluid valves such as, but not limited to, water taps and ballcock valves which is less susceptible to wear and otherwise at least partially alleviates the above described deficiencies in the prior art. It is a further object of the present invention to provide a valve closure member which incorporates the sealing member.

According to a first aspect of the present invention there is provided a sealing member for a fluid valve, the sealing member including:

a body defining a cavity; and, a resiliently deformable membrane extending across one end of the body and provided with an aperture through which fluid can flow to enter the cavity, the one end of the sealing member configured to seat against a valve seat of the fluid valve, wherein when the sealing member is seated on the valve seat to at least partially seal the valve, fluid enters the cavity through the aperture and by action of fluid pressure forces the resiliently deformable membrane against the valve seat to further seal the valve.

Preferably the resiliently deformable membrane is formed integrally with the body.

Preferably the body comprises a disc shaped first wall and an integral cylindrical wall extended around the periphery of the first wall, the first wall and the cylindrical wall forming the cavity.

Preferably the resiliently deformable membrane is located at an end of the cylindrical wall opposite the first wall and extends radially inwardly.

Preferably the aperture is formed coaxially with a longitudinal axis of the cylindrical wall.

Preferably the resiliently deformable membrane is formed with increased thickness along a radius in the direction from an edge of the aperture toward the cylindrical wall.

Preferably the increased thickness is formed on a side of the resiliently deformable membrane adjacent the cavity.

Preferably the sealing member further includes an annular rib protruding from a side of the resiliently deformable outside of the cavity, the rib configured to initially contact the valve seat.

Accordingly to another aspect of the present invention there is provided a valve closure member for sealing onto a valve seat of a fluid valve, the valve closure member including;

a housing; and a sealing member in accordance with the first aspect of the present invention, the sealing member retained within the housing and orientated so that fluid can flow through the aperture into the cavity; whereby, in use, an actuator can be coupled to the housing to linearly move the valve closure member to a position where the sealing member is seated on the valve seat to at least partially seal the fluid valve and wherein fluid entering the cavity through the aperture, by action of fluid pressure, forces the resiliently deformable membrane against the valve seat to further seal the fluid valve.

Preferably the housing includes a main body provided with a hollow for retaining the sealing member in a position so that the resiliently deformable membrane is disposed near a first end of the housing closest the valve seat.

Preferably the resiliently deformable membrane is positioned forward of the first end of the housing.

Preferably the housing and the sealing member are relatively configured so as to releasably engage each other.

Preferably, the housing is provided with first engaging means formed within the hollow for receiving a second engaging means formed on an outer periphery surface of the sealing member.

Preferably the first engaging means comprises one or more rebates formed within the hollow.

Preferably the first engaging means comprises a circumferential rebate formed within the hollow, and the second engaging means comprises a flange or portion of increased outer diameter formed about the outer peripheral surface of the sealing member.

Preferably the housing further includes a stem extending from a back side of the main body coaxially with the hollow for coupling with said actuator.

Preferably said housing is made of a rigid of material.

Preferably said housing is made of a rigid plastics material such as ACETAL. However alternately; the housing may be made from a metal or alloy including, but not limited to, brass.

Preferably the sealing member is made of a rubber material.

Preferably the rubber material has a hardness on the Shore scale in the order of 60 to 100.

In one embodiment, the rubber material is SANTOPRENE.

BRIEF DESCRIPTION OF THE DRAWINGS

Embodiments of the present invention will now be described, by way of example only, with reference to the accompanying drawings in which:

FIG. 1 is a sectional view of a sealing member in accordance with the first embodiment of the present invention;

FIG. 2 is a bottom view of the sealing member shown in FIG. 1;

FIG. 3 is a sectional view of a housing for the sealing member shown in FIGS. 1 and 2;

FIG. 4 is a bottom view of the housing shown in FIG. 3;

FIG. 5 is a sectional view of a first embodiment of a valve closure member incorporating the sealing member shown in FIGS. 1 and 2 and the housing shown in FIGS. 3 and 4;

FIG. 6 is a sectional view of a second embodiment of a valve closure member;

FIG. 7 is a bottom view of the valve closure member shown in FIG. 6; and,

FIG. 8 is a sectional view of a ballcock float valve incorporating the valve closure member shown in FIGS. 6 and 7.

DETAILED DESCRIPTION OF THE PREFERRED EMBODIMENTS

As shown with particular reference to FIGS. 1, 2 and 5 a first embodiment of the sealing member 10 for a fluid valve in the form of a tap 12 includes a body 14 defining a cavity 16 and, a resiliently deformable membrane 18 extending across a lower end 20 of the body 14. The membrane 18 is provided with an aperture 22 through which fluid such as water can flow to enter the cavity 16. The tap 12 has an inlet 24 which is in fluid communication with a water mains, an outlet 26 and a seat 28 through which water must flow in order to pass from the inlet 24 to the outlet 26. The sealing member 10 is configured to seat against the valve seat 28. When the sealing member 10 is seated on the seat 28 to at least partially seal the tap 12 water enters the cavity 16 through the aperture 22 and, by action of fluid pressure in the water, forces the resiliently deformable membrane 18 against the valve seat 28 to further seal the tap 12.

The body 14 has a disc shaped wall 30 and an integral cylindrical wall 32 extending thereabout the periphery of the base 30. The base 30 and the wall 32 together define or create the cavity 16. The membrane 18 is formed integrally with the body 14 and extends radially inwardly from the inside of the wall 32 across the lower end 20. The aperture 22 is formed coaxially with the cavity 16. As is most apparent from FIG. 1, the thickness of the membrane 18 increased along a radius in the direction from an edge of the aperture 22 toward the cylindrical wall 32. This provides increased mechanical strength, resilience, and pressure wave absorption.

An annular rib 34 is formed continuously with the cylindrical wall 32 and protrudes from a side of the membrane 18 distant the base 30. Thus, in use, when the sealing member 10 is used to seal or close the tap 12, the rib 34 is the first part to make contact with the seat 28.

A portion 36 of the cylindrical wall 32 nearest the base 30 is formed with an increased outer diameter. This portion 36 can be likened to a flange formed circumferentially about an outer peripheral surface of the wall 32. As described in greater detail provided, the portion or flange 36 assists in retaining the sealing member 10 within a housing as well as assists in damping pressure waves the water or other fluid flowing through the valve or tap 12.

Typically, the sealing member 10 will be incorporated into a housing suitable for the valve in which it is to be used. FIGS. 3–5 show one type of housing 38 which would typically be incorporated when the sealing member 10 is to be used to seal or close off a conventional domestic tap 12. The combination of the housing 38 and sealing member 10 in effect forms a valve closure member 39 which is similar in function to, though different in operation from, a conventional washer assembly for a tap 12.

The housing 38 has a body 40 formed with a hollow 42 for retaining the sealing member 10. The body 40 is in the form of a squat cylinder 44 closed off at one end by a wall 46 but open at the opposite end 48. The bore of the cylinder 44 together with the wall 46 define the hollow 42. A circumferential rebate 50 is formed on an inside surface of the cylinder 44 adjacent the wall 46. The rebate 50 and the portion/flange 36 of the sealing member 10 are formed of complimentary shape and configuration and form mutually engagable first and second engaging means respectively. Accordingly, as shown in FIG. 5, the sealing member 10 is retained within the housing 38 by way of a snap or press-fit with the portion/flange 36 tightly received within the rebate 50. A stem 52 extends from a side of the wall 46 distant the end 48 and is disposed coaxially with the aperture 22 and cylindrical wall 32. The stem 52 would be received within a blind hole formed an end of a spindle (not shown) of tap 12.

The housing 38, and in particular the body 40, is made of a material of sufficient rigidity so as to substantially maintain its shape and configuration (and thus not burst) when subjected to the normal operating pressures of the fluids in which it is to be used. Appropriate materials for the housing 38/body 40 are the plastics material ACETAL and the alloy brass. However other plastics materials and metals or alloys can be used provided the aforementioned rigidity requirement is maintained.

It is envisaged that at least the resiliently deformable membrane 18 is made from a rubber material and preferably of a rubber material having a hardness on the Shore scale in the order of 60 to 100. One particularly well suited material is SANTOPRENE. However, enhanced antihammer characteristics are provided if the whole of the sealing member 10 is made from a rubber material. For ease of manufacture, it is of course preferred that the whole of the sealing member 10 is made from the same type of material.

The operation of the sealing member 10 and the washer assembly 39 will be described with reference to a conventional tap 12.

The washer assembly 39 is designed to retrofit a conventional tap 12. In order to install the assembly 39, the tap head (not shown) is unscrewed from the tap body and the conventional washer replaced with the assembly 39. To this end, the stem 52 is inserted into the blind hole at the bottom of the tap spindle and the tap head then screwed down onto the tap body.

Rotation of the spindle by way of an attached handle in a clockwise direction lowers the tap spindle and thus the assembly 39 toward the seat 28 i.e., the assembly 39 moves linearly toward the seat 28. Initially, the rib 34 contacts the seat 28. This initial contact forms at least a partial seal about the seat 28 to inhibit although not totally stop water flow between the inlet 24 and outlet 26. At this time, water under mains pressure entering through the inlet 24 passes through aperture 22 into the cavity 16. The pressure of the water within the cavity 16 causes the membrane 18 to be deflected downwardly to seal against the seat 28. This further assists in shutting off the tap 12. That is, the tap 12 is sealed or closed by a combination of both water pressure deforming the membrane 18 against the seat 28 together with the pressure exerted by the rib 34 via the housing 28 and spindle (not shown) onto the seat 28.

It will be appreciated that even when the seat 28 is rough or uneven, and thus the rib 34 by itself would not form a complete seal, the deflection of the membrane 28 by action of the water pressure assists in forming a seal about the seat 28 thus closing the tap 12.

In addition to this, the housing 38 limits the pressure that can be applied to the sealing member 10 because as the handle is turned further down, the rib 34 is compressed to a maximum where it is flush with the end 48 of body 40. It is not physically possible to push the housing 38 and thus the sealing member 10 into further contact with this seat 28 beyond this position. Also, as the rib 34 is compressed into the hollow 42 there is typically a reduction in the volume of the cavity 16. This leads to an increase in fluid pressure within the cavity 16 therefore increasing the sealing pressure of the membrane 18 against the seat 28.

It has further been found that water hammer is substantially reduced by use of the sealing member 10 by itself or in combination with housing 38. This is believed to arise due to the resilience of the membrane 18 and the body 14. Water hammer is caused by a reflection in the water pressure as the flow of water is turned off rapidly. Embodiments of the sealing member 10 at least partially absorb and/or damp the speed of formation of the pressure wave leading to a reduction in water hammer.

A second embodiment of the sealing member and the valve closure member as shown in FIGS. 6–8 in these figures features which correspond to the first embodiment are denoted with the same reference numbers but with the addition of the prime symbol.

The sealing member 10' is essentially identical to the sealing member 10 shown in FIGS. 1–5 with the exception that the sealing member 10' does not include a rib which corresponds to rib 34 of the first embodiment. Thus, in the sealing member 10', the resiliently deformable membrane 18' is substantially flush with the end of the cylindrical wall 32. Nevertheless, the membrane 18' and the end of the cylindrical wall 32 both extend beyond end 48' of a housing 38' in which the member 10' is retained. The sealing member 10' includes a disc shaped first wall 30' having an integral cylindrical wall 32' which together define a cavity 16'. The membrane 18' extends across an end of cylindrical wall 32' distant the first wall 30' as provided with a central aperture 22' through which fluid can flow into the cavity 16'. Portion 36' of the cylindrical wall 32' near the wall 30' is formed of increased external diameter.

The housing 38' is also of a substantial identical configuration to the housing 38. Together, the sealing member 10' and housing 38' form a valve closure member 39' for closing a ballcock valve 54 of a type typically found in a cistern. The ballcock valve 54 includes a tubular member 56 which is provided at its upper end with a valve seat 58. A housing 60 is detachably attached to the upper end of the tubular member 56. The housing 60 defines a chamber 62 in which the valve closure member 39' is slidably retained. A fulcrum 64 is pivotally coupled intermediate its length to the housing 60. A float 66 is attached to an end 68 of the fulcrum 64 distant its pivot point 70 with the housing 60. The opposite end 72 of the fulcrum 64 is disposed so as to overlie the top of stem 52' of the housing 38'.

The position of the float 66, and thus the fulcrum 64, varies with the level of water within the cistern. When the water level reaches a predetermined height, end 72 of the fulcrum 64 pushes against the stem 52' to seat the sealing member 10' against seat 58. When in this position, the sealing member 10' and in particular resiliently deformable membrane 18' act in an identical manner to that described in relation to the first embodiment to form a seal about the seat 58 thus shutting off the flow of water through the tubular member 56. That is, water enters the cavity 16' through aperture 22' to cause the membrane 18' to deflect downwardly and seal against the seat 58 thereby closing or shutting off the ballcock valve 54. Hence, the sealing of the ballcock valve 54 is assisted by the pressure of the water regulated by the valve 54.

Now that embodiments of the present invention have been described in detail it will be apparent to those skilled in the relevant arts and numerous modifications and variations may be made without departing from the basic inventive concepts. For example, the body 14, 14' and resilient deformable membrane 18, 18' can be made as separate components and then attached or otherwise fixed together to form the sealing member 10, 10'. Further, it is possible for the body 14, 14' to be made from a material different to that used for the resiliently deformable membrane 18, 18'. In addition, the portion/flange 36, 36' and rebate 50, 50' is to releasably connect the sealing member 10, 10' to the housing 38, 38' can be replaced with other mutually engagable means to achieve the same effect. For example, a boss or knob can be formed on the base 30, 30' so as to snap fit or press fit into a complimentarily shaped hole or recess formed in the wall 46 of housing 38. Additionally the sealing member 10, 10' and/or corresponding valve closure members 39, 39' can be actuated by a mechanism or devices other than spindles or fulcrums. For example, an alternate type of actuator could be an electromagnet such as in a solenoid valve.

All such modifications and variations, together with others as would be apparent to persons of ordinary skill in the relevant arts, are deemed to be within the scope of the present invention the nature of which is to be determined from the aforegoing description and the appended claims.

I claim:

1. A sealing member for sealing a fluid valve, comprising:
   a cylindrical wall having a first axially end, a second axially end and a substantially cylindrical inner surface;
   a disc-shaped wall extending across the first axial end of said cylindrical wall and forming with said cylindrical wall a substantially cylindrical-shaped cavity; and
   a resiliently deformable membrane extending substantially radially inward across the second axial end of said cylindrical wall from the substantially cylindrical inner surface of said cylindrical wall to an aperture through which fluid can enter the substantially cylindrical-shaped cavity, wherein said resiliently deformable membrane is deformable outward from the substantially cylindrical-shaped cavity by pressure from fluid within the substantially cylindrical-shaped cavity.

2. The sealing member according to claim 1, further comprising:
   an annular rib extending substantially axially from the second axial end of said cylindrical wall, such that said annual rib protrudes axially beyond the substantially cylindrical-shaped cavity and said resiliently deformable membrane in the absence of deformation of the sealing member.

3. The sealing member according to claim 1, wherein a thickness in an axial direction of said resiliently deformable membrane increases from the aperture to said cylindrical wall.

4. The sealing member according to claim 1, wherein a portion of said cylindrical wall has an outer circumference greater than an outer circumference of said cylindrical wall at said second axial end.

5. The sealing member according to claim 1, wherein the sealing member is formed of a resilient material.

\* \* \* \* \*